United States Patent Office 2,704,154
Patented Mar. 15, 1955

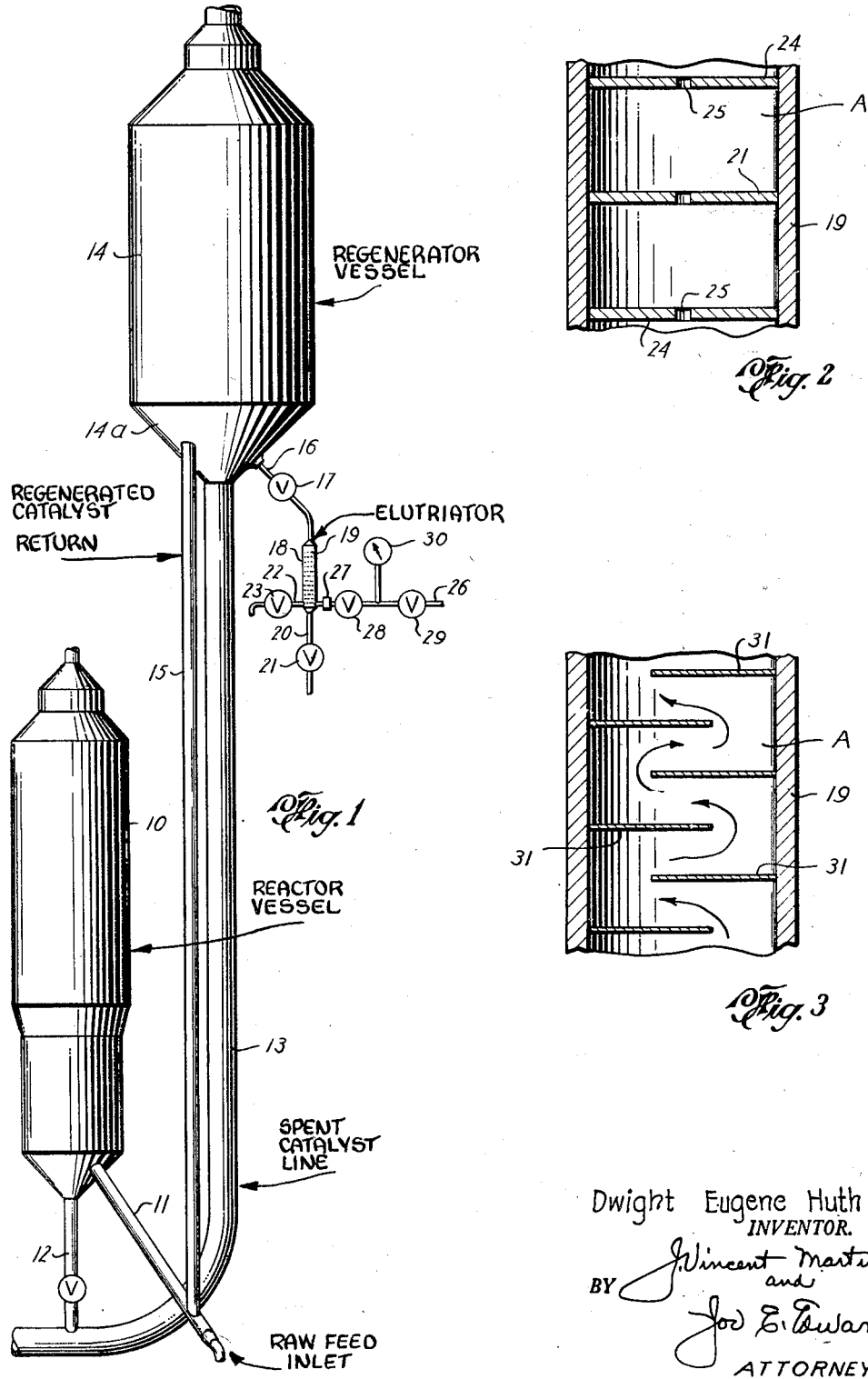

2,704,154

ELUTRIATOR FOR USE WITH REGENERATOR VESSEL OF A CATALYTIC CRACKING APPARATUS

Dwight Eugene Huth, Houston, Tex., assignor to Eastern States Petroleum Co., Inc., Houston, Tex., a corporation of Texas Application October 24, 1949, Serial No. 123,246

1 Claim. (Cl. 209—138)

This invention relates to new and useful improvements in methods of and apparatus for withdrawing catalyst from the regenerator vessel of a catalytic cracking apparatus.

As is well known, the usual fluid catalytic cracking apparatus employs a reactor vessel within which the catalyst forms a "bed" and is maintained in a turbulent fluid condition by the entering feed vapors. The continuous upward flow or passage of the vapors effects intimate contact of oil with the catalyst and as the process progresses, coke is formed on the catalyst. The spent catalyst, laden with coke, is then directed to the regenerator vessel wherein the coke is burned off and the catalyst is regenerated, after which it is returned for reuse within the reactor.

In a process of this character, it is generally recognized that catalyst in a fine state, as compared to coarse catalyst, is more effective in producing the desired results because the coarse catalyst is generally not as active for catalytic reaction due to having remained in the unit for a longer period of time. The coke laden catalyst from the reactor is carried up into the regenerator vessel and includes both the coarse catalyst and the so-called fine or minute particles of catalyst. Periodically, catalyst is added to the system and it is, of course, evident that it is desirable to withdraw coarse catalyst from the system because, as stated, such coarse catalyst is generally not as active for catalytic reaction, and its presence in the system decreases the overall efficiency of the process.

It is one object of the present invention to provide an improved method for withdrawing coarse catalyst from the system or apparatus employed in a catalytic cracking process whereby the coarse catalyst which is generally not as active for catalytic reaction may be efficiently removed.

An important object of the invention is to provide an improved method for withdrawing coarse catalyst which consists in removing the coarse catalyst from the lower portion of the regenerator vessel of the catalytic cracking apparatus, directing the withdrawn catalyst downwardly through an upwardly moving stream of air whereby the heavier coarse catalyst may fall downwardly and be discharged while the relatively fine or minute particles of catalyst which may have been inadvertently withdrawn with the coarse catalyst may be returned to the regenerator vessel.

Still another object of the invention is to provide an improved apparatus for withdrawing catalyst from the regenerator vessel of a catalytic cracking apparatus which includes a discharge line extending from the lower end of the regenerator vessel and which has an elutriator mounted therein, together with means for directing a stream of air upwardly through the elutriator whereby the coarse catalyst withdrawn through the discharge line falls downwardly through the air stream and also whereby said air stream functions to return the fine catalyst which enters the discharge line into the regenerator vessel.

Still another object is to provide an improved apparatus for withdrawing catalyst from a regenerator vessel which includes an elutriator comprising a chamber having baffles or obstructions therein, whereby the downwardly falling catalyst is caused to take a circuitous or undulating path through the chamber to assure that an upwardly flowing air stream within the chamber may return the fine or exceptionally minute particles of catalyst to the regenerator.

Other and further objects of the invention will appear as the description proceeds.

In the accompanying drawings which form a part of the instant specification, are to be read in conjunction therewith, and wherein like reference numerals are used to indicate like parts in the various views:

Figure 1 is an elevation of a reactor and regenerator employed in catalytic cracking units and illustrating a catalyst withdrawal apparatus, constructed in accordance with the invention connected with the regenerator, Figure 2 is an enlarged partial vertical sectional view taken through the elutriator vessel and Figure 3 is a view similar to Figure 2 showing a modified form of baffle arrangement.

In the drawings, the numeral 10 designates a reactor vessel of a catalytic cracking apparatus which has a fluid inlet pipe 11 extending into its lower end. A catalytic bed (not shown) is maintained within the lower end of the reactor vessel and spent catalyst, laden with coke, is discharged from the reactor vessel through a discharge line 12. The line 12 has connection with a riser 13 through which the spent catalyst is carried by air upwardly into the lower end of a regenerator vessel 14. Within the regenerator the spent catalyst is regenerated and is returned through a return line 15 to the inlet line 11 whereby it may again enter the reactor vessel. The catalyst which is introduced into the system is preferably of a relatively fine nature but the heavier particles are referred to as coarse catalyst. The coarse and fine catalyst is, of course, admixed to some extent and is carried through the system by the various air currents which are employed in apparatus of this character. A certain amount of coarse catalyst will accumulate in the lower portion of the regenerator vessel 14 and as is well known, coarse catalyst is generally inactive for catalytic reaction since the fine catalyst is much more efficient in carrying out the catalytic cracking process. It thus occurs that coarse catalyst which is actually of little benefit in the system accumulates in the lower end of the regenerator and is ultimately recirculated in the system even though it is no longer as effective.

For the purpose of withdrawing the coarse catalyst from the lower end of the regenerator vessel, a discharge line 16 extends from the hopper portion 14a of the regenerator vessel 14. A suitable valve 17 may be connected in the line 16 and said line has communication with an elutriator 18 which is in the form of a cylindrical housing or casing 19. A discharge line 20 having a control valve 21 therein may extend to a hopper or other container for receiving the coarse catalyst which is discharged from the lower end of the elutriator 18. A sampling line 22 also extends from the lower end of the elutriator and has a suitable control valve 23 mounted therein.

As is clearly shown in Figure 2, the elutriator comprises the cylindrical casing 19 and the interior of said casing forms a vertical chamber A. A plurality of baffle plates 24 are disposed in spaced relationship throughout the vertical height of the casing 19 and each plate has a central opening 25 therein. An air supply line 26 is connected to the lower end of the casing 19 for the purpose of supplying air under pressure to the lower end of the chamber A. A suitable orifice 27 for controlling the volume may be mounted in the line 26 and also control valves 28 and 29 may be connected in said line. A suitable pressure gauge 30 for indicating the pressure of the air stream is mounted in the line preferably between the control valves 28 and 29.

In the operation of the withdrawal apparatus the valves 21 and 23 are closed while the valve 17 in the discharge conductor 16 is opened and thus catalyst may fall downwardly through the line into the elutriator. At the same time the valves 28 and 29 in the air supply line are opened and an air stream of desired volume and pressure is directed upwardly through the chamber 19 of the elutriator. This air stream strikes the transverse baffle plates 24 and then flows upwardly through the openings 25 in said plates so that the stream is constantly upward through the elutriator and then through the discharge line 16 into the lower end of the regenerator vessel. The majority of catalyst which will be withdrawn through the line 16 will be coarse catalyst because the heavier coarse catalyst has settled into the lower hopper portion 14a of the regenerator vessel. However, some fine catalyst which will be effective and which should remain in the system will be discharged through the line 16. As the catalyst falls into the elutriator it will, of course, strike the baffle plates and will be constantly agitated by the upwardly flowing air stream. The heavier catalyst will ultimately find its way downwardly through the openings 25 in the baffle plates 24 and will fall downwardly into the discharge line 20. The fine catalyst will be picked up by the air stream and will in effect become entrained in the stream and will be returned in the regenerator vessel for recirculation through the system. The withdrawn coarse catalyst may then be directed through the discharge line 20 to a disposal hopper (not shown).

It will be apparent that the withdrawal apparatus may be operated as desired to withdraw accumulated coarse catalyst which is no longer useful in the process in the system and thus constant recirculation of coarse catalyst which is of little use is eliminated. The arrangement of the elutriator whereby the coarse catalyst is directed downwardly in opposition to an upwardly flowing air stream assures that fine catalyst which is still useful for its purpose in the process is not discharged but rather is returned in the system. The withdrawal apparatus is preferably operated at desired intervals as the coarse catalyst accumulates in the regenerator vessel but if desired may be operated continuously.

The particular baffle arrangement which is employed within the elutriator casing 19 is subject to variation and in Figure 3 a modified form of baffle arrangement is illustrated. In this form a plurality of baffles 31 which are mounted in spaced relation throughout the vertical length of the chamber A are disposed in staggered relation to each other and it will be evident that such arrangement will cause both the downwardly falling catalyst and the upwardly flowing air stream to take a circuitous or undulating path through the chamber A. This circuitous or undulating path which the catalyst is caused to take prevents the catalyst from falling downwardly in a direct line through the chamber A and provides an opportunity for the upwardly flowing air stream to pick up and entrain the fine catalyst which is ultimately returned to the system. It is, of course, apparent that the particular construction of the baffles and their arrangement within the casing may be in any desired manner so long as a free direct fall of the catalyst through the chamber A is prevented. One of the important features of the invention is that the method is carried out at a point in the catalytic cracking unit where the coarse catalyst is most apt to accumulate and such point is located at the lower end of the regenerator vessel 14.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawings is to be interpreted as illustrative and not in a limiting sense.

Having described the invention, I claim:

An apparatus of the character described including a casing, an air inlet line connected to the lower end of said casing, means for supplying and forcing an air stream upwardly through the casing in a direction opposed to the movement of catalyst material moving through said casing with a sufficient velocity to carry relatively fine catalyst material particles upwardly therewith, and baffles having relatively small centrally located vertical openings therethrough mounted perpendicularly to and transversely within said casing for impeding the downward movement of the catalyst material as the air stream moves upwardly whereby agitation of the catalyst material within the casing is produced and also whereby the fine particles of catalyst material are entrained and carried along by the air stream.

References Cited in the file of this patent

UNITED STATES PATENTS

| | | |
|---|---|---|
| 2,161,500 | Bird et al. | June 6, 1939 |
| 2,325,611 | Keranen | Aug. 3, 1943 |
| 2,349,574 | Conn | May 23, 1944 |
| 2,355,016 | Stein | Aug. 1, 1944 |
| 2,420,049 | Martin | May 6, 1947 |
| 2,430,015 | Hatton et al. | Nov. 4, 1947 |
| 2,440,620 | Taff | Apr. 27, 1948 |
| 2,483,485 | Barr | Oct. 4, 1949 |
| 2,506,307 | Martin | May 2, 1950 |
| 2,517,042 | Skelly | Aug. 1, 1950 |
| 2,567,207 | Hoge | Sept. 11, 1951 |
| 2,631,981 | Watson et al. | Mar. 17, 1953 |

FOREIGN PATENTS

| | | |
|---|---|---|
| 164,259 | Germany | Oct. 21, 1905 |
| 501,068 | France | Jan. 16, 1920 |
| 889,851 | France | Jan. 21, 1944 |